Dec. 1, 1931.　　R. P. CALLARD ET AL　　1,834,143
GLASS CUTTING APPARATUS
Filed May 3, 1926　　3 Sheets-Sheet 1

Inventors
Robert P. Callard.
John H. Moller.
By Frank Fraser
Attorney

Dec. 1, 1931. R. P. CALLARD ET AL 1,834,143
GLASS CUTTING APPARATUS
Filed May 3, 1926 3 Sheets-Sheet 2

Inventors
Robert P. Callard.
John H. Moller.
By Frank Fraser
Attorney

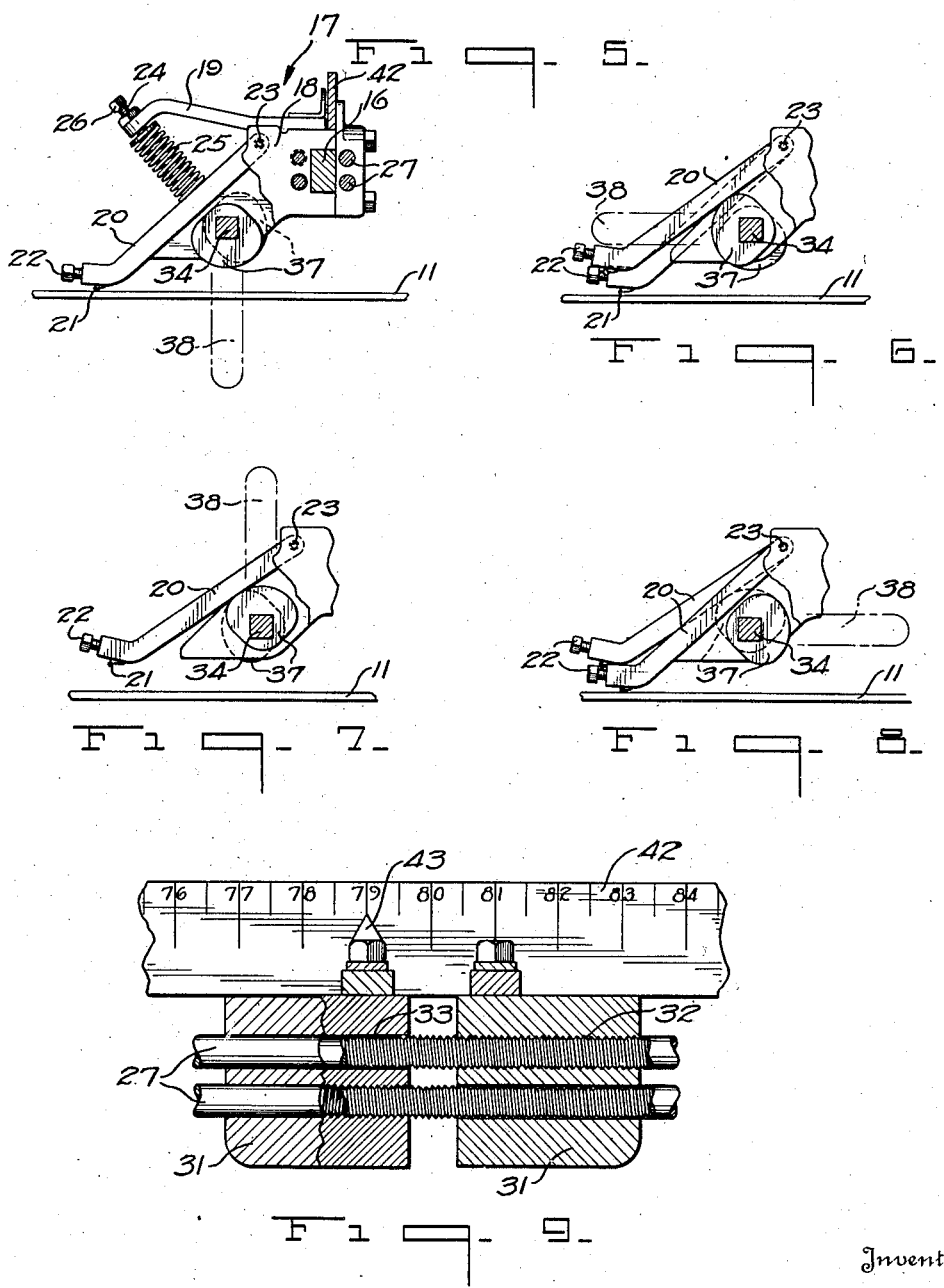

Patented Dec. 1, 1931

1,834,143

UNITED STATES PATENT OFFICE

ROBERT P. CALLARD AND JOHN H. MOLLER, OF CHARLESTON, WEST VIRGINIA, ASSIGNORS TO LIBBEY-OWENS-FORD GLASS COMPANY, OF TOLEDO, OHIO, A CORPORATION OF OHIO

GLASS CUTTING APPARATUS

Application filed May 3, 1926. Serial No. 106,294.

The present invention relates to sheet glass apparatus, and has particular reference to scoring or cutting apparatus.

An important object of the invention is to provide an apparatus for scoring a sheet of glass in a manner that a plurality of strips may be removed from each edge of said sheet.

Another important object of the invention is to provide an apparatus for scoring a moving sheet of glass a plurality of times along each edge so that a plurality of strips may be removed therefrom.

A further object of the invention is to provide an apparatus for trimming a continuously moving sheet of glass by arranging scoring devices in proximity to the sheet of glass in a manner that a rough cut and a finished cut can be made.

A still further object of the invention is to provide a glass cutting apparatus for scoring a moving sheet of glass, preferably as the sheet issues from an annealing leer, the sheet being supported upon a table and adapted to move in contact with suitable scoring devices, the scoring devices being arranged preferably above the sheet so that one or more cuts can be made along the edges of the sheet, the apparatus including operating means for moving the desired cutters into and out of engagement with said sheet.

Other objects and advantages of the invention will become apparent during the course of the following description.

Figure 1:
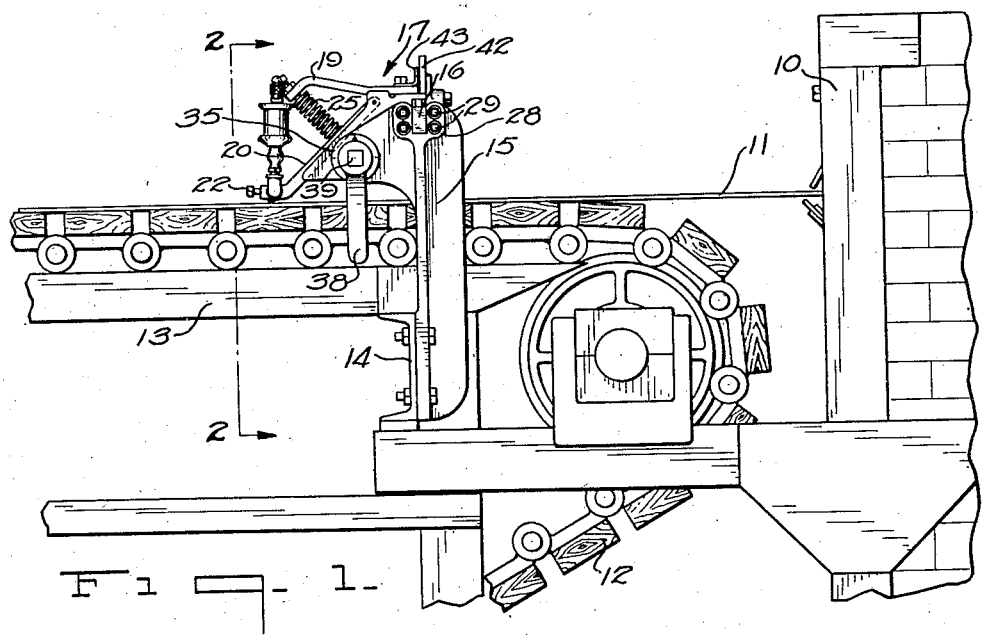
Figure 2:
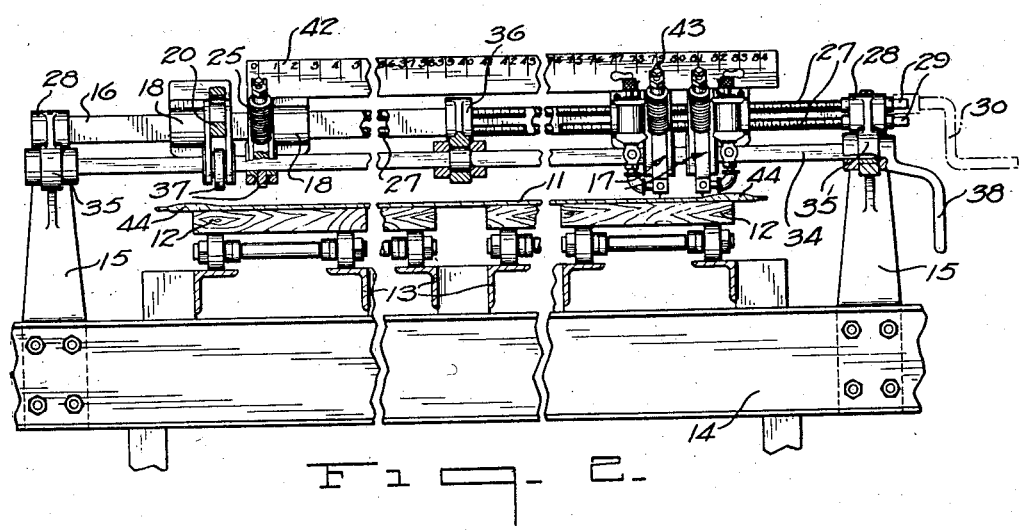
Figure 3:
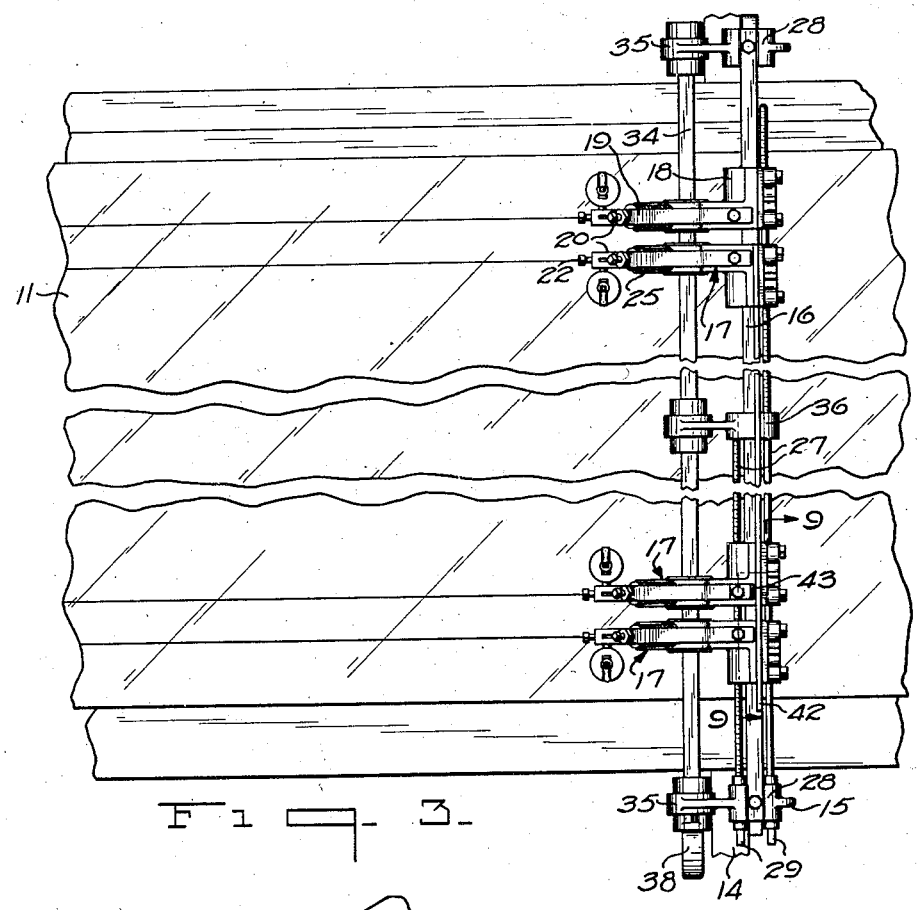
Figure 4:
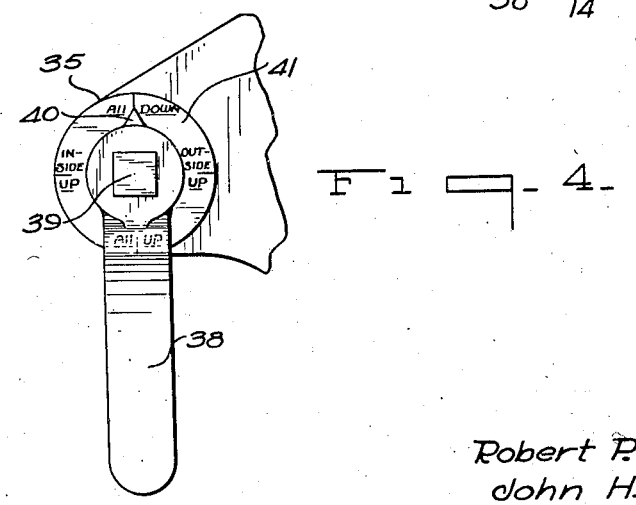

In the drawings wherein like numerals are employed to designate like parts throughout the same, Fig. 1 is a side elevation of the invention, Fig. 2 is a section taken on line 2—2 of Fig. 1, Fig. 3 is a plan view of the invention, Fig. 4 is an enlarged detail of the operating lever, Figs. 5, 6, 7 and 8, inclusive, are diagrammatic views illustrating the cutting mechanism in various positions, and Fig. 9 is a section taken on line 9—9 of Fig. 3.

The present invention is particularly well adapted, although not necessarily limited, to use with the Colburn machine. In the Colburn machine a sheet of glass is initially drawn in a vertical plane from a mass of molten glass, being deflected from the vertical to a horizontal plane, where it passes over a flattening table and through an annealing leer. The sheet passes from the annealing leer onto a cutting table where the sheet or ribbon of glass may be scored transversely to cut the same into lengths.

In the Colburn machine suitable edge engaging width maintaining means are arranged at the sheet source to prevent narrowing of the sheet as it is being drawn in the vertical plane. These sheet edge engaging devices form what is known in the art as knurled edges which are relatively thick and are removed from the sheet either on the cutting table or some other place when the sheet is reduced to commercial sizes.

In the commercial operation of the Colburn machine, it has been customary to arrange at the end of the leer, scoring devices, one at each side of the sheet, to trim off the knurled edge above referred to. The Colburn machine is capable of producing various thicknesses of sheets, depending upon the speed and temperature at which the sheet is drawn. It has been found in trimming the edges from the thicker sheets, namely the quarter inch and three-sixteenths inch thicknesses for example, that a single cut, by the knurl trimmers referred to, is not what might be called a clean cut. The art has developed to a stage where a clean cut is practically demanded by the trade, and it is an object of the present invention to provide an apparatus whereby all thicknesses of sheets of glass can be mechanically trimmed in a manner that the resultant edge shows a clean cut. To this end, there is provided a pair of scoring devices or cutters in proximity to each edge of the sheet. It has been found, in actual practice, that by scoring the sheet along two parallel lines and then breaking the sheet first along the outer score line and then along the inner score line that the second break will leave a clean cut while the first break will throw spalls and the like and act to chip the edges of the sheet. This is due to internal strains in the heavy knurled edges of the sheet which are formed during the drawing operation and which strains are not relieved during annealing but are relieved after the first cut has been completed to remove the heavier knurled edge portion so that when the sheet is broken along the second score a clean severing of the sheet is had.

In the drawings the numeral 10 designates the exit end of an annealing leer through which the sheet 11 has passed. The sheet 11 moves out upon the cutting table 12 which may comprise a plurality of wooden blocks or the like, hingedly associated and adapted to run upon the rails 13. Arranged below the upper run of the table 12 is a beam 14 supporting the upright standards 15, shown in Figs. 1 and 2. Connected between the standards 15, arranged at opposite sides of the cutting table, is a cross member 16 upon which are slidably mounted a plurality of scoring or cutting devices designated in their entirety by the numeral 17. The cutting devices comprise a body portion 18, carrying a stationary arm 19 and a pivoted arm 20. A scoring tool 21, such as a hardened metal wheel or a diamond, is carried by the pivoted arm 20, being held in position by means of the screw 22. The arm 20 is pivotally associated by means of the pin 23 to the body portion 18, and has extending therefrom a shaft 24, passing through the stationary arm 19. A spring 25 is interposed between the arms 19 and 20 to normally urge the cutting or scoring member 21 downwardly. An adjusting screw 26 is provided to regulate the tension of the spring 25.

As is clearly shown in Figs. 2 and 3, four cutting members are used, the cutting members being arranged in pairs, one pair being disposed adjacent both edges of the sheet 11 to be scored. The scoring tools are adjustably mounted on the cross members 16, and to effect their adjustment, screw-threaded shafts 27 are arranged transversely of the cutting table, and are journaled at the operating end through suitable bearings or the like 28. Each of the threaded shafts 27 terminates in an end 29, engageable with a suitable crank or the like 30, by which means the shafts may be rotated. Each of the scoring devices is connected with a threaded shaft 27 by means of a block 31, shown in Fig. 9. In the present case using two pairs of cutters, two threaded shafts are arranged on each side of the cross bar 16 so that each of the shafts 27 passes through two blocks 31. As shown in Fig. 9, the shafts 27 have screw-threaded engagement with one block only as at 32, while the other block has a bore 33 therethrough, of sufficient size to permit undisturbed movement of the shaft. By operating the shafts 27 with a crank 30, the block, having screw-threaded engagement therewith, will be moved in a direction dependent upon the direction of rotation of the crank so that the cutters, each of which is controlled by means of a threaded shaft, can be arranged in any desired location.

Although it is ordinarily desirable to make use of the four cutters as shown in the drawings, sometimes it is desirable to disengage either the inside cutters, the outside cutters or all of the cutters. To accomplish this, cam shaft 34 is mounted transversely of the sheet, being journaled at its ends at 35 in the standards 15. The cam shaft 34 may be supported centrally of its length by means of a suitable bearing 36, carried by the cross bar 16. A cam 37, which is clearly shown in Fig. 2, is provided for each of the scoring members 17, and is movable therewith. The cam shaft is operated by means of an arm 38, and as shown in Fig. 4, the arm 38 is mounted on the squared end 39 of said shaft. The arm is also provided with a pointer 40, which operates about a face 41 suitably marked to indicate the position of the cutters. In Fig. 4, the plate 41 is marked to show when the cutters are all down, when the outside cutters are up and the inside cutters down, all the cutters up, and the inside cutters up and the outside cutters down. It will thus be seen that the outside cutters work together and the inside cutters work together. Of course this arrangement can be varied by changing the type of cams used. In Fig. 5 is shown diagrammatically the position of the cams 37 when the cutters are all down. As the outside cam of the two units and the inside cam of the two units are identical, the two cams illustrated in the diagrammatic views will be sufficient. In Fig. 6 the cam has been rocked to move the outer cutters from engagement with the sheet 11 which is being scored. In Fig. 7 both of the cams have been rocked to throw both of the cutters out of engagement, while in Fig. 8, the cams are in a position to permit the outside cutter to be in engagement with the sheet, while the inside cutter is out of engagement.

To determine the net width of sheet being cut, which is the sheet between the two inside cuts, a suitable scale 42 is provided. The scale 42 is preferably rigidly associated with one of the inside cutters 17 and movable therewith, while the opposite end is slidably associated with the other of said inner cutters. A pointer 43 is carried by the second mentioned cutter to indicate the distance between the scoring points of the two inside cutters.

In operation, the lever 38 is operated to move all of the scoring tools out of engagement with the sheet of glass. The shafts 27 are then operated to place the cutting tools in their desired relationship. The outside cutters, as shown in Fig. 2, are automatically adjusted so that the knurled edge 44 is removed, while the inner cutters are adjusted to remove a second strip of glass. In the thicker sheets of glass the first cut will be more or less ragged, while the second cut will be a clean cut acceptable in the trade. After the cutters have been adjusted to give the desired net width of the sheet, the lever 38 may be rocked until the cutters engage the sheet of glass. The cutters then remain stationary as regards their positions, and the sheet moving therebeneath is scored, after which the strips may be removed. Of course it is understood that other means are used for scoring the sheet transversely to reduce the same to the desired lengths.

Oil supply means may be associated with each scoring device 17 to aid in the scoring of the glass.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. In combination with means for receiving and supporting a moving sheet of glass as it issues from an annealing leer, means associated with said receiving and supporting means for trimming the longitudinal edges from the sheet, including a cross member extending transversely thereof, a pair of spaced cutters carried by the cross member adjacent each longitudinal edge of the sheet, and separate means associated with said cutters independently operable to move the cutters transversely with respect to the sheet to vary the distance therebetween.

2. In combination with means for receiving and supporting a moving sheet of glass as it issues from an annealing leer, means associated with said receiving and supporting means for trimming the longitudinal edges from the sheet, including a cross member extending transversely thereof, a pair of spaced cutters carried by the cross member adjacent each longitudinal edge of the sheet, and a threaded shaft for each cutter having threaded engagement therewith whereby upon rotation of said shafts, the cutters may be selectively and independently movable transversely with respect to the sheet to vary the distance therebetween.

3. In combination with means for receiving and supporting a moving sheet of glass as it issues from an annealing leer, means associated with said receiving and supporting means for trimming the longitudinal edges from the sheet, including a pair of spaced cutters positioned adjacent each longitudinal edge of the sheet, means for supporting said cutters, a cam shaft extending transversely of the sheet supporting means and arranged beneath said cutters, a plurality of cams carried by said shaft, one for each cutter, said cams being so shaped and positioned that upon continued rotation of the cam shaft in a predetermined direction, the outer cutters will first be raised from the glass, then the inner cutters raised, the outer cutters then lowered, and finally the inner cutters lowered.

4. In combination with means for receiving and supporting a moving sheet of glass as it issues from an annealing leer, means associated with said receiving and supporting means for trimming the longitudinal edges from the sheet, including inner and outer scoring devices arranged adjacent each longitudinal edge of the sheet, means for supporting said scoring devices, means for moving the scoring devices transversely with respect to the sheet, a scale plate carried by one of the inside scoring devices and movable therewith, and a pointer carried by the other inside scoring device and adapted to cooperate with the scale plate to indicate the distance between the scoring points of the two inside scoring devices.

Signed at Charleston, in the county of Kanawha, and State of West Virginia, this 29th day of April, 1926.

ROBERT P. CALLARD.
JOHN H. MOLLER.